United States Patent [19]

Vogt et al.

[11] 4,020,010

[45] Apr. 26, 1977

[54] TIN TITANIUM COMPLEXES AS ESTERIFICATION/TRANSESTERIFICATION CATALYSTS

[75] Inventors: Herwart C. Vogt, Grosse Ile; Manher Parekh, Woodhaven; John T. Patton, Jr., Wyandotte, all of Mich.

[73] Assignee: BASF Wyandotte Corporation, Wyandotte, Mich.

[22] Filed: Dec. 29, 1975

[21] Appl. No.: 644,357

[52] U.S. Cl. .................. 252/431 C; 252/431 R
[51] Int. Cl.$^2$ ............................. B01J 31/2
[58] Field of Search ................ 252/431 R, 431 C

[56] References Cited

UNITED STATES PATENTS

| | | | |
|---|---|---|---|
| 3,056,818 | 10/1962 | Werber | 252/431 C |
| 3,714,234 | 1/1973 | White | 252/431 R |
| 3,716,523 | 2/1973 | Cook | 260/75 M |
| 3,884,832 | 5/1975 | Pullukat | 252/431 R |

*Primary Examiner*—Winston A. Douglas
*Assistant Examiner*—John F. Niebling
*Attorney, Agent, or Firm*—Norbert M. Lisicki; Bernhard R. Swick; Robert E. Dunn

[57] ABSTRACT

Complexes of stannous carboxylate and tetraalkyl titanate are effective esterification and transesterification catalysts.

7 Claims, No Drawings

TIN TITANIUM COMPLEXES AS ESTERIFICATION/TRANSESTERIFICATION CATALYSTS

BACKGROUND OF THE INVENTION

1. Field of the Invention

This invention relates to the preparation of tin-titanium complexes. More specifically, this invention relates to a process of preparing esters and polyesters in an improved manner by using these novel complexes as esterification/transesterification catalysts.

2. Prior Art

The preparation of esters and polyesters is well known in the art. These materials are prepared by esterifying mono- and/or polyhydric alcohols with mono- and/or polycarboxylic acids. In many instances it is desirable to prepare such esters or polyesters having a very low acid number, i.e., less than two. However, the attainment of an ester or polyester having a low acid number is extremely difficult to achieve. For example, during the last stage of the esterification of the reaction, the reaction proceeds extremely slowly and hence in order to reduce the acid value it is necessary to heat for a lengthy period of time at relatively high temperatures. This, in many instances, tends to bring about formation of a darkened ester or polyester which is unsuitable for further use. Various attempts have been made to reduce the time of the esterification reaction. For instance, British Pat. No. 792,011 describes the use of iron, cadmium, cobalt, lead, zinc, antimony and manganese in the form of the metal, its oxide or its salt with a bibasic acid. Other catalyst types are more reactive. For example, stannous compounds of the type $Sn(OOCR)_2$ wherein R is selected from the group consisting of saturated and unsaturated aliphatic hydrocarbon constituents having from about 7 to about 17 carbon atoms have been described in U.S. Pat. No. 3,162,616 and U.S. Pat. No. 3,716,523. Organo titanium or organo zirconium compounds have been disclosed by U.S. Pat. No. 3,056,818 as being suitable as esterification catalysts. Titanium compounds are often insoluble in the product and must be removed by filtration or other tedious procedures. The technical literature also notes that esterification is usually effected by refluxing the acid and alcohol with a small amount of acid catalyst such as sulfuric acid, hydrochloric acid, and sulfonic acids or boron trifluoride. Acid catalyst often causes color formation and must be removed to insure a stable low acid number product.

Esters may also be prepared by transesterification reactions. These transesterification reactions include the reactions between two esters to yield two new esters or the reaction between an ester and an alcohol to form a new ester and liberate an alcohol. Included also are the transesterification reactions where the components of the esters involved are polyhydroxy alcohols and polybasic acids. These reactions may, in some instances, be catalyzed by those substances which are employed for the esterification procedure. We have discovered that polyesters having an acid number less than two can be prepared in relatively short period of time with tin-titanium catalyst complexes employing either esterification or transesterification procedures.

SUMMARY OF THE INVENTION

It has been discovered that certain unique combinations between a tin carboxylate and a tetraalkyl or tetraaryl titanate will result in complexes which are more efficient than the individual metal components as esterification/transesterification catalysts. The complexes may be used for any type of mono- or polycarboxylic acid and anhydride to be esterified with any suitable hydroxyl containing material.

DESCRIPTION OF THE PREFERRED EMBODIMENTS

The tin-titanium complex may be described by the following general formula:

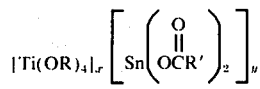

wherein R is a radical selected from the group consisting of an aliphatic radical having from 1 to 18 carbon atoms, an alicyclic radical having between 1 and 3 rings, between 5 and 6 carbon atoms per ring and between 5 and 18 carbon atoms per molecule, and an aromatic radical having between 1 and 3 rings and between 6 and 18 carbon atoms per molecule, R' is an organic radical having from 1 to 18 carbon atoms and $x$ and $y$ are whole numbers in the ratio of 1:1 to 1:8.

The complexes of this invention are prepared by reacting together, under anhydrous conditions, and in the absence of air, at room temperature, the desired concentration of stannous carboxylates with the desired amount of tetraalkyl or tetraaryl titanate. It may also be desired to heat the reactants if shorter reaction times are desired and to assure completeness of reaction. The reaction of these two clear liquids is often accompanied by orange, light yellow, or red color formation and the liberation of heat. Sometimes it is desirable to carry out this preparation in a suitable inert solvent to permit easier handling of the complex. Solvents such as anhydrous xylene may be employed. In addition to the color formation and heat evolution which indicate a new complex compound has been formed, it has been found that the tin-titanium complex has improved hydrolytic stability. It is well known that stannous salts of organic acids and titanium alkylates are very susceptible to trace amounts of moisture which leads to rapid hydrolysis, catalyst deactivation, and often solid formation. For example, tetrabutyl titanate is immediately decomposed by water forming titanic acid. Atmospheric moisture may produce high molecular weight condensation products which proceed until titanium dioxide or the hydrous titanium dioxide is formed. Stannous octoate undergoes similar hydrolysis type reactions with water and precautions must be taken to prevent the destruction of the catalyst.

Any suitable stannous salt of a carboxylic acid may be used to prepare the complex. These may be described by the following formula:

wherein R is a saturated or unsaturated, straight or branched chain, aliphatic or aromatic substituent having from about 1 to about 18 carbon atoms in its chain. Stannous octoate and stannous oleate are preferred. Other suitable stannous salts are stannous naphthenate, stannous acetate, stannous butyrate, stannous ethyl hexoate, stannous laurate, stannous palmitate, and stannous stearate.

The titanium compounds which are employed can be represented by the general formula:

wherein R is a radical selected from the group consisting of an aliphatic radical having from 1 to 18 carbon atoms, an alicyclic radical having between 1 and 3 rings, between 5 and 6 carbon atoms per ring, and between 5 and 18 carbon atoms per molecule, and an aromatic radical having between 1 and 3 rings and between 6 and 18 carbon atoms, per molecule.

Examples of these compounds include tetramethyl titanate, tetraethyl titanate, tetraallyl titanate, tetrapropyl titanate, tetraisopropyl titanate, tetrabutyl titanate, tetraisobutyl titanate, tetraamyl titanate, tetracyclopentyl titanate, tetrahexyl titanate, tetracyclohexyl titanate, tetrabenzyl titanate, tetraoctyl titanate, tetraethylhexyl titanate, tetranonyl titanate, tetradecyl titanate, and tetraoleyl titanate.

Mixed alkyl titanate compounds would include trimethylbutyl titanate, dimethyldibutyl titanate, triethylbutyl titanate, methyl isopropyl dibutyl titanate, diethyl dibutyl titanate, propyl tributyl titanate, ethyl tricyclohexyl titanate, diisopropyl dioctadecyl titanate, and dibutyl dioctadecyl titanate.

Included among the aromatic titanates are tetraphenyl titanate, o- and m-tetramethylphenyl titanate, and 1- and 2-tetranaphthyl titanate.

The concentrations of complex which may be employed in the preparation of ester or polyester polyols can be varied over a fairly wide range. Small amounts such as 0.00002 mole of complex (0.2 × 10⁻⁴) per 1000 grams of ester or polyester have been successfully employed and amounts as high as 0.0174 mole of complex (174 × 10⁻⁴) per 1000 grams of polymer or higher can be used. Preferably, amounts less than 0.00174 mole of complex (17.4 × 10⁻⁴) per 1000 grams of ester or polyester are employed. The presence of large quantities may result in the presence of an unwanted impurity depending upon the future use of the ester or polyester polyol. Although the complex may be initially introduced with the material to be esterified, it is preferred to introduce the complex at the time when the esterification reaction has slowed down and the acid number has reached a value of about 15–20. Reaction conditions under which esterification is effected can be varied considerably. The reaction generally proceeds very slowly at room temperature but at elevated temperatures, preferably under reflux, the reaction rate is quite rapid so that about 99 percent of the acid is converted to ester within a few hours. To force the equilibrium towards the formation of the product the water of esterification is removed as rapidly as it forms. One accepted way this can be accomplished is by carrying out the reaction in a liquid medium which forms an azeotrope with water having a boiling point that is lower than that of either component of the reaction. It is to be understood however, that if the reactants and the esters which result, boil at temperatures well above 100° Centigrade at atmospheric pressure, the reaction temperature can be sufficiently high and would not require azeotrope forming liquid reaction medium. Generally, temperatures of 150°–250° Centigrade are employed. The reaction can be carried out under reduced or superimposed pressures. To facilitate water removal at the later stages of esterification, a vacuum of 0.1–100 mm Hg is employed. The time of reaction will depend on the reactivity of the reactants, the stoichiometry, temperature, and pressure employed in the reaction, the molecular weight of the resulting polyester, the rapidity with which the water of esterification is removed, and the activity of the catalyst employed, if any.

Any mono- or polycarboxylic acid and anhydrides thereof may be employed for the preparation of esters. Thus, the acids undergoing esterification can be aliphatic, cycloaliphatic or aromatic and they can be substituted or unsubstituted. Among the acids which may be employed include acetic, acrylic, propionic, propiolic, isobutyric, methacrylic, n-butyric, pivalic, ethylmethylacetic, isovaleric, chloroacetic, α-chloropropionic, n-valeric, dichloroacetic, diethylacetic, isocaproic, α-ethyl-n-butyric, methoxyacetic, n-caproic, ethoxyacetic, bromoacetic, heptoic, α-ethyl-n-caproic, α-bromoisovaleric, hexahydrobenzoic, dibromoacetic, n-caprylic, α-phenylpropionic, undecanoic, β-phenylpropionic, mesitylenic, tricarballylic, α,β-dibromosuccinic, tartaric, 3,5-dinitrosalicyclic, p-toluic, acetylenedicarboxylic, veratric (anhydrous), p-fluorobenzoic, 2,4-dinitrobenzoic, anisic, β-naphthoic, acetylanthranilic, camphoric, hippuric, succinic, aconitic, m-nitrocinnamic, 2-chloro-3,5-dinitrobenzoic, fumaric, m-hydroxybenzoic, p-coumaric, phthalic, o-coumaric, p-hydroxybenzoic, β-resorcylic, tetrachlorophthalic, p-bromobenzoic, isophthalic, terephthalic, trimesic, β-benzoylpropionic, p-isopropylbenzoic, benzoic, o-benzoylbenzoic, γ-benzoylbutyric, 2,4-dimethylbenzoic, maleic, o-(p-toluyl)-benzoic, 2,5-dimethylbenzoic, sebacic, mandelic, cinnamic, acetylsalicylic, phenylpropiolic, glutaconic (cis), glutaconic (trans), 2,6-dichlorobenzoic, o-chlorobenzoic, m-nitrobenzoic, meso-tartaric, suberic, furylacrylic, o-nitrophenylacetic, 3-nitrosalicyclic, diphenylacetic, o-nitrobenzoic, phthalonic, p-hydroxyphenylacetic, o-bromobenzoic, benzilic, adipic, p-nitrophenylacetic, 2,5-dichlorobenzoic, citric, m-bromobenzoic, 2,4,6-trimethylbenzoic, salicyclic, m-chlorobenzoic, 2,4-dichlorobenzoic, α-naphthoic, 2,3-dichlorobenzoic, 3,4-dimethylbenzoic, oleic, methacrylic, latic, β-bromoisobutyric, thiobenzoic, undecylenic, undecanoic, hexahydrobenzoic, capric, pivalic, β-chloropropionic, lauric, angelic, dibromoacetic, β-phenylpropionic (hydrocinnamic),α-bromoisobutyric, bromoacetic, elaidic, γ-phenylbutyric, myristic, trichloroacetic, β-bromopropionic, palmitic, chloroacetic, α,β-dibromopropionic, cyanoacetic, stearic, crotonic (trans), phenylacetic, glycolic, citraconic, phenoxyacetic, phthalaldehydic, glutaric, o-methoxybenzoic, o-toluic, pimelic, azelaic, m-toluic, ethylmalonic, malonic, suberic, brassylic, thapsic, fumaric, glutaconic, α-hydromuconic, β-hydromuconic, α-butyl-α-ethyl glutaric, α,β-diethyl succinic, isophthalic, terephthalic, hemimellitic, 1,4-cyclohexane dicarboxylic.

Anhydrides of mono- and polybasic acids can be used in place of the acids. These include acetic anhydride, propionic anhydride, n-butyric anhydride, citraconic anhydride, n-valeric anhydride, crotonic anhydride, n-heptoic anhydride, benzoic anhydride, chloroacetic anhydride, maleic anhydride, itaconic anhydride, 4-nitrophthalic anhydride, succinic anhydride, cinnamic anhydride, phthalic anhydride, 1,2-naphthalic anhydride, camphoric anhydride, 2,3-naphthalic anhydride, α-naphthoic anhydride, 1,8-naphthalic anhydride, tetrabromophthalic anhydride, and tetrachlorophthalic anhydride.

Among the monohydric and polyhydric alcohols which can be reacted with carboxylic acids and anhydrides include methyl alcohol, ethyl alcohol, isopropyl alcohol, tert-butyl alcohol, allyl alcohol, n-propyl alcohol, sec-butyl alcohol, tert-amyl alcohol, isobutyl alcohol, methylisopropylcarbinol, n-butyl alcohol, diethylcarbinol, sec-amyl alcohol, ethylene glycol monomethyl ether, 1-chloro-2-propanol, sec-butylcarbinol, ethylene chlorohydrin, isoamyl alcohol, 4-methyl-2-pentanol, 2-chloro-1-propanol, ethylene glycol monoethyl ether, 3-hexanol, methylisobutylcarbinol, n-amyl alcohol, cyclopentanol, 2-ethyl-1-butanol, 2-bromoethanol, di-n-propylcarbinol, n-hexyl alcohol, 2-heptanol, 2-methylcyclohexanol, furfuryl alcohol, ethylene glycol mono-n-butyl ether, 4-methylcyclohexanol, 3-methylcyclohexanol, cyclohexanol, trichloroethyl alcohol, lauryl alcohol, cinnamyl alcohol, α-terpineol, o-tolycarbinol, myristyl alcohol, menthol, anisyl alcohol, pinacol hydrate, p-tolycarbinol, sorbitol, triphenylcarbinol, mannitol, benzopinacol, borneol, inositol, pentaerythritol, diisobutylcarbinol, n-heptyl alcohol, tetrahydrofurfuryl alcohol, 2-octanol, cyclohexycarbinol, 2,3-dichloro-1-propanol, 2-ethyl-1-hexanol, propylene glycol, n-octyl alcohol, diethylene glycol monomethyl ether, ethylene glycol, diethylene glycol monoethyl ether, methylphenylcarbinol, benzyl alcohol, n-nonyl alcohol, trimethylene glycol, m-tolylcarbinol, β-phenylethyl alcohol, ethylphenylcarbinol, diethylene glycol mono-n-butyl ether, n-decyl alcohol, γ-phenylpropyl alcohol, diethylene glycol, ethylene glycol monophenyl ether, cinnamyl alcohol, glycerol, benzohydrol, dipropylene glycol, triethylene glycol, tetraethylene glycol, 1,4-tetramethylene glycol, 1,2-butylene glycol, 1,4-butanediol, 1,3-butanediol, 1,5-pentanediol, 1,4-pentanediol, 1,3-butanediol, 1,6-hexanediol, 1,7-heptanediol, glycerol, 1,1,1-trimethylolpropane, 1,1,1-trimethylolethane, hexane-1,2,6-triol, neopentyl glycol, 1,10-decanediol, and 2,2-bis (4-hydroxycyclohexyl) propane.

The following Examples are provided to further illustrate the invention. In these Examples the compounds designated by letters A, B, C, D, and E are as follows:

Compound A is stannous octoate.
Compound B is stannous oleate.
Compound C is tetrabutyl titanate.
Compound D is tetraisopropyl titanate.
Compound E is tetrakis-2-ethylhexyl titanate.

The designations C/A, C/2A, D/2B, etc., indicate the relative mole ratios of the respective compounds employed to form the complexes. Parts and percents are by weight unless otherwise indicated.

EXAMPLE 1

In a 300-milliliter round bottom flask equipped with a stirrer, thermometer, dropping funnel, and nitrogen sparge, 17.02 grams (0.050 mole) tetrabutyl titanate was carefully added with stirring to 40.40 grams (0.100 mole) stannous octoate dissolved in 172.3 grams xylene (anhydrous) at 25° Centigrade. The temperature of the mixture rose slightly and a yellow-orange color developed.

EXAMPLE 2

Using equipment similar to that described in Example 1, 13.03 grams (0.0458 mole) tetraisopropyl titanate was added to 62.50 grams (0.0916 mole) stannous oleate at 23° Centigrade. The temperature rose to 36° Centigrade and a dark red color developed.

EXAMPLES 3–19

The following series of experiments in Table I below were conducted to determine the hydrolytic stability of titanium/tin complexes. The mole ratio of stannous carboxylate/tetraalkyl titanate was increased as shown below. The molar concentration of water was kept constant. The indicated amounts of each component were added to glass test tubes, stoppered and vigorously shaken. The solutions were then observed for any development of haze indicating hydrolysis had occurred.

Table I

| Example No. | Mole Ratio A:C | Moles of Compound A × $10^{-4}$ | Moles of Compound C × $10^{-4}$ | Moles of Water × $10^{-4}$ | Appearance |
|---|---|---|---|---|---|
| 3 | 1:1 | 50 | 50 | 55 | Clear solution |
| 4 | 2:1 | 50 | 25 | 55 | Clear solution |
| 5 | 4:1 | 50 | 12.5 | 55 | Clear solution |
| 6 | 8:1 | 50 | 6.25 | 55 | Slightly hazy |
| 7 | 16:1 | 50 | 3.125 | 55 | Slightly hazy |

| Example No. | Mole Ratio A:D | Moles of Compound A × $10^{-4}$ | Moles of Compound D × $10^{-4}$ | Moles of Water × $10^{-4}$ | Appearance |
|---|---|---|---|---|---|
| 8 | 1:1 | 50 | 50 | 55 | White precipitate |
| 9 | 2:1 | 50 | 25 | 55 | Clear solution |
| 10 | 4:1 | 50 | 12.5 | 55 | Clear solution |
| 11 | 8:17 | 50 | 6.25 | 55 | Slightly hazy |

| Example No. | Mole Ratio B:C | Moles of Compound B × $10^{-4}$ | Moles of Compound C × $10^{-4}$ | Moles of Water × $10^{-4}$ | Appearance |
|---|---|---|---|---|---|
| 12 | 1:1 | 50 | 50 | 55 | White precipitate |
| 13 | 2:1 | 50 | 25 | 55 | Clear solution |
| 14 | 4:1 | 50 | 12.5 | 55 | Clear solution |
| 15 | 8:1 | 50 | 6.25 | 55 | Clear solution |

| Example No. | Mole Ratio B:D | Moles of Compound B × $10^{-4}$ | Moles of Compound D × $10^{-4}$ | Moles of Water × $10^{-4}$ | Appearance |
|---|---|---|---|---|---|
| 16 | 1:1 | 50 | 50 | 55 | White precipitate |
| 17 | 2:1 | 50 | 25 | 55 | Clear solution |
| 18 | 4:1 | 50 | 12.5 | 55 | Clear solution |
| 19 | 8:1 | 50 | 6.25 | 55 | Clear solution |

EXAMPLES 20–29

The polyester of the following Examples was prepared by the following procedure:

Into a 22-liter, four-neck, round bottom reaction vessel, equipped with stirrer, thermometer, vacuum pump, condenser, nitrogen gas sparge tube, and heater, 1,4-butanediol (3225 g. = 35.8 moles), ethylene glycol (2226 g. = 35.8 moles) and adipic acid (9549 g. = 65.4 moles) were added. The reaction mixture was gradually heated to 170°–180° Centigrade with the water of reaction being removed continually. When the rate of water removal slowed down, the reaction temperature was increased to 225° ± 5° Centigrade and vacuum was slowly and carefully applied until a vacuum of 10 mm Hg was reached. The reaction was stopped when the polyester mixture had an acid number of 18.73. This was stored and used as a master batch for investigation of the catalytic effect of various compounds on the acid numbers of this polyester in Examples 20–29.

The polyester, 1160 grams, was transferred to a two-liter, round bottom reaction flask, equipped with stirrer, thermometer, vacuum pump, condenser, nitrogen gas sparge tube and heater. The polyester was then heated to 225°± 5° Centigrade and a sample again removed to determine the initial acid number. The designated compound was then added and the polyester mixture was allowed to react for one hour. The acid number was checked and additional compound added as indicated. The mixture was then reacted for an additional hour and the final acid number was then determined. The results in Table II indicate that the complexes are considerably more reactive than the individual compounds as indicated by the concentration of compound required to achieve the final acid number. The variations in the initial acid number are due to a variation in the time of heating the individual polyester mixture prior to addition of the various compounds.

Table II

| | Examples | | | | | | | | | |
|---|---|---|---|---|---|---|---|---|---|---|
| Compound | 20 | 21 | 22 | 23 | 24 | 25 | 26 | 27 | 28 | 29 |
| | C | C/A | C/2A | C/3A | C/4A | A | D | B | D/2B | D/2A |
| Initial Acid Number | 15.46 | 16.92 | 14.98 | 19.34 | 17.32 | 14.32 | 17.06 | 15.42 | 17.60 | 17.95 |
| Amount of Compound, 1st Addition, gms. | 0.03 | 0.03 | 0.03 | 0.03 | 0.03 | 0.03 | 0.03 | 0.03 | 0.03 | 0.03 |
| Acid Number after 1 hour | 1.17 | 1.73 | 0.68 | 5.32 | 5.20 | 4.60 | 0.97 | 7.45 | 3.83 | 0.86 |
| Amount of Compound, 2nd Addition, gms. | 0.03 | 0.03 | 0.00 | 0.03 | 0.03 | 0.03 | 0.03 | 0.03 | 0.03 | 0.03 |
| Acid Number after 2 hours | 0.29 | 0.39 | 0.48 | 0.35 | 0.47 | 0.48 | 0.26 | 2.04 | 0.39 | 0.30 |
| (Total Moles of Compound/ 1000 gms. of Ester) × $10^{-4}$ | 1.5 | 0.7 | 0.2 | 0.3 | 0.26 | 1.2 | 1.8 | 0.7 | 0.3 | 0.5 |

EXAMPLES 30–33

A 5-liter flask equipped with a condenser, stirrer, thermometer, distillation column and nitrogen sparge tube was charged with the designated quantities of ethylene glycol, diethylene glycol and adipic acid. The flask was vacuum purged twice and then sparged with nitrogen. The flask was then heated to 140° Centigrade at which temperature water began to distill off. The temperature was gradually raised to 220°–225° Centigrade with constant water removal. When the column head temperature dropped to 70°–75° Centigrade, vacuum of about 10 mm mercury pressure was applied. Water continued to be removed as required by a drop of head temperature. When the acid number of the reaction mixture reached about 16, the designated compound was added. Heating was continued with additional water removal until an acid number of less than 0.5 was achieved. The polyesters were cooled to 100° Centigrade and discharged from the reaction vessel. The results in Table III illustrate the efficiency of the complexes in reducing the time cycle of the polyester reaction.

Table III

| | Examples | | | |
|---|---|---|---|---|
| Components, gms. | 30 | 31 | 32 | 33 |
| Ethylene glycol | 1426 | 1200 | — | — |
| Diethylene glycol | — | — | 1350 | 1350 |
| Adipic Acid | 2467 | 2467 | 1620 | 1620 |
| Compound | — | C/2A | A | C/2A |
| (Moles of compound/ 1000 gms. of Polyester) × $10^{-4}$ | — | 0.34 | 1.84 | 0.26 |
| Properties | | | | |
| Acid Number | 0.48 | 0.48 | 0.47 | 0.39 |
| Cycle time required to achieve final | | | | |

Table III-continued

| | Examples | | | |
|---|---|---|---|---|
| Components, gms. | 30 | 31 | 32 | 33 |
| acid number, hrs. | 22 | 16 | 18 | 16 |

EXAMPLES 34–35

The procedure using the equipment of Examples 30–33 was followed in the subsequent Examples with one difference. The flask was charged with the glycol and the anhydride followed by an addition of 11.0 grams of sodium acetate. This mixture was stirred for about one hour followed by the addition of the adipic acid. The remainder of the procedure of Example 30 was then followed. The addition of the sodium acetate is intended to neutralize any residual acidity of the acid catalyst which is employed in preparing the halogenated phthalic anhydride.

The Examples in Table VI illustrate the utility of the complex employing acid anhydrides for the preparation of polyesters.

Table IV

| | Examples | |
|---|---|---|
| Components, gms. | 34 | 35 |
| Ethylene glycol | 368 | — |
| Butanediol | 480 | — |
| Diethylene glycol | — | 1400 |
| Adipic Acid | 588 | 684 |
| Tetrachlorophthalic anhydride | — | 1340 |
| Tetrabromophthalic anhydride | 1863 | — |
| Compound | C/2A | C/2A |
| Compound Concentration (moles/1000 gms. of Polyester) × $10^{-4}$ | 0.20 | 0.23 |
| Properties | | |
| Acid Number | 0.48 | 0.51 |
| Cycle time required to achieve final acid number, hrs. | 12 | 16 |

EXAMPLES 36–37

The procedure using the equipment of Examples 30–33 was employed in the preparation of another type of polyester. The reactants and concentrations are listed in Table V below.

Table V

| | Examples | |
|---|---|---|
| Components, gms. | 36 | 37 |
| Tetraethylene glycol | 830 | 830 |

Table V-continued

| Components, gms. | Examples | |
|---|---|---|
| | 36 | 37 |
| Trimethylolpropane | 575 | 575 |
| Adipic acid | 625 | 625 |
| Compound | — | C/2A |
| Compound Concentration (moles/1000 gms. of Polyester) × 10⁻⁴ | — | 0.46 |
| Properties | | |
| Acid Number | 0.46 | 0.36 |
| Cycle time required to achieve final acid number, hrs. | 15 | 9 |

EXAMPLES 38–41

The products of Examples 38–41 were prepared in a one-liter, three-necked flask equipped with a condenser, stirrer, manometer, nitrogen gas sparge tube, stirrer and Dean-Stark tube. The flask was charged with 390 grams of 2-ethyl hexanol (3 moles), 148 grams of phthalic anhydride (1 mole), and 2 grams of the compound as designated below. The reaction was conducted at a temperature of 205° Centigrade. The extent of the reaction was determined by measuring the water collected in the Dean-Stark tube. The results of Examples 38–41 in Table VI indicate that the tin-titanium complexes are more efficient catalyst than the tin catalyst alone in the preparation of esters.

Table VI

| Example No. | Compound | Moles Compound/ 1000 gms. Ester × 10⁻⁴ | Time Required for 100% Reaction, min. |
|---|---|---|---|
| 38 | C/2A | 44.0 | 60 |
| 39 | D/2A | 47.0 | 64 |
| 40 | E/2A | 37.0 | 60 |
| 41 | A | 126 | >92 |

EXAMPLES 42–45

A one-liter flask equipped with condenser, stirrer, thermometer and heating mantle was charged with 400 grams of poly(ethylene glycol adipate) polyester. The polyester which was prepared in the absence of any catalyst had an approximate molecular weight of about 2000, an acid number of 0.37 and contained 0.17% free ethylene glycol as measured by gas chromatographic analysis. One percent (4 grams) of ethylene glycol was added to the flask and the mixture was heated to and maintained at 200° Centigrade during the course of the reaction. The designated compound was then added to the flask and periodic samples were withdrawn at the intervals stated below. The concentration of ethylene glycol was determined by gas chromatographic procedures. The results of Table VII indicate that the tin-titanium complex is a more active transesterification catalyst than are either the stannous octoate or the tetrabutyl titanate alone.

Table VII

| | Examples | | | |
|---|---|---|---|---|
| | 42 | 43 | 44 | 45 |
| Compound | — | A | C | C/2A |
| Moles of Compound/ 1000 gms. of ester × 10⁻⁴ | — | 6 | 7 | 2 |
| % Free Ethylene Glycol after | | | | |
| 5 min. | 0.88 | 0.86 | 0.79 | 0.71 |
| 15 | 0.71 | 0.67 | 0.43 | 0.47 |
| 30 | 0.71 | 0.55 | 0.43 | 0.39 |
| 60 | 0.53 | 0.51 | 0.32 | 0.32 |
| 120 | 0.44 | 0.39 | 0.30 | 0.26 |
| 180 | 0.30 | 0.39 | 0.30 | 0.26 |

The embodiments of the invention in which an exclusive property or privilege is claimed are defined as follows:

1. The method of preparing complexes comprising mixing a tetraalkyl or tetraaryl titanate compound having the formula Ti(OR)₄ wherein R is a radical selected from the group consisting of an aliphatic radical having from 1 to 18 carbon atoms, an alicyclic radical having between 1 and 3 rings, between 5 and 6 carbon atoms per ring, and between 5 and 18 carbon atoms per molecule, and an aromatic radical having between 1 and 3 rings and between 6 and 18 atoms per molecule, with a stannous carboxylate having the formula

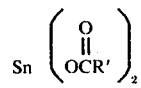

wherein R' is an organic radical having from 1 to 18 carbon atoms in a mole ratio from 1:1 to 1:8 titanate to stannous carboxylate and stirring the mixture until substantially all the titanate has reacted with the stannous carboxylate to form said complex.

2. The method of claim 1 wherein the tetraalkyl titanate is selected from the group consisting of tetraisopropyl titanate and tetrabutyl titanate and the stannous carboxylate is selected from the group consisting of stannous octoate and stannous oleate.

3. The method of claim 1 wherein the mole ratio of titanate to carboxylate is from about 1:2 to 1:4.

4. The composition produced by the method as claimed by claim 1.

5. The composition produced by the method as claimed by claim 2.

6. The composition produced by the method as claimed by claim 3.

7. The method as claimed by claim 1 wherein the reaction is conducted in the presence of an inert solvent.

* * * * *